United States Patent [19]

Chilcot

[11] 4,344,905

[45] Aug. 17, 1982

[54] GAS LASERS

[75] Inventor: Arthur L. Chilcot, Aberlady, Scotland

[73] Assignee: Ferranti Limited, Hollinwood, England

[21] Appl. No.: 90,510

[22] Filed: Nov. 2, 1979

Related U.S. Application Data

[62] Division of Ser. No. 840,252, Oct. 7, 1977, abandoned.

[51] Int. Cl.³ ............................................... B22F 3/02
[52] U.S. Cl. .................................................... 264/111
[58] Field of Search ........................ 75/206, 200, 211; 264/111

[56] References Cited

U.S. PATENT DOCUMENTS

| | | |
|---|---|---|
| 2,145,690 | 1/1939 | Hensel .................................. 75/232 |
| 2,539,298 | 1/1951 | Doty et al. ......................... 75/232 X |
| 2,752,665 | 7/1956 | Streicher .............................. 75/232 |
| 3,085,876 | 4/1963 | Alexander et al. ............... 75/232 X |
| 3,166,417 | 1/1965 | Gainsbury ......................... 75/232 X |
| 3,175,904 | 3/1965 | Grant .................................... 75/232 |

OTHER PUBLICATIONS

Sands et al., *Powder Metallurgy* 1966, p. 35.

*Primary Examiner*—Brooks H. Hunt
*Attorney, Agent, or Firm*—Kerkam, Stowell, Kondracki & Clarke

[57] ABSTRACT

A cathode electrode for a gas discharge laser comprises a block of platinum black compressed into a solid mass.

4 Claims, No Drawings

GAS LASERS

This is a division of copending application Ser. No. 840,252, filed Oct. 7, 1977, and now abandoned.

This invention relates to gas lasers, and in particular to electrodes for discharge-excited gas lasers.

Many gas lasers are excited by an electric discharge struck through the gas between anode and cathode electrodes. One of the problems which arises at least in some types of gas laser is that the gas filling may react with the electrode material, and hence care has to be taken in the selection of the electrode material. For example, in the so-called carbon dioxide laser the gas filling comprises a mixture of carbon dioxide, nitrogen and helium, sometimes with other additives such as xenon. Carbon dioxide and nitrogen react with many metals, and the choice of electrode material in such lasers is usually reduced to the noble metals. Platinum is frequently used, or an alloy such as platinum-rhodium.

The metallic cathode electrodes, particularly the noble metals, used in gas lasers tend to sputter considerably under the ion bombardment resulting from the gas discharge, and material sputtered from the cathode becomes deposited on the walls of the discharge vessel adjacent to the electrode. This deposition of cathode material material tends to trap molecules of the gas filling, thus reducing its pressure and hence the life and power of the laser.

It is an object of the invention to provide a cathode electrode for a gas discharge laser, and a method of forming such an electrode, in which sputtering is substantially reduced.

According to the present invention a cathode electrode for a gas-discharge laser comprises a pellet of platinum black powder compressed under high pressure to form a solid mass of electrically conductive material.

Such an electrode may include up to 25% by weight of a metal oxide which is reducible by unwanted constituents of the gas mixture. Preferably the oxide is cupric oxide.

Also according to the invention a method of forming a cathode electrode for a gas discharge laser comprises compressing a quantity of platinum black powder under high pressure to form a solid mass of electrically conductive material.

Platinum black powder is well known as a finely-divided form of platinum metal. An electrode for a laser is made by compressing a quantity of platinum black powder at a pressure of the order of 50 tons per square inch. This forms a solid non-crumbling electrically conductive pellet which has been found to exhibit a very low sputtering rate when used as a cathode electrode for a gas discharge laser. To improve the choesion of the platinum black particles the powder may first be heated in hydrogen at a temperature between, say, 700° C. and 900° for several minutes, and then cooled before compression into pellets.

A particular problem which arises with the carbon dioxide laser is that the carbon dioxide tends to be dissociated into carbon monoxide. This tendency may be countered by including in the electrode up to 25% by weight of cupric oxide. The effect of the cupric oxide is to counter the formation of carbon monoxide by itself being reduced to cuprous oxide by reaction with the carbon monoxide formed.

When the mixture of platinum black powder and cupric oxide, having been thoroughly mixed, is heated in hydrogen as mentioned above, the cupric oxide is reduced to metallic copper. It is therefore necessary in such a case to reoxidise the exposed cupric oxide in the compressed pellet. This is done by heating the pellet in oxygen at a similar temperature for a suitable period of time, say two hours.

As already stated, a cathode electrode of the type described above exhibits a very low sputtering rate which therefore results in a laser having a longer useful life. Although its use in carbon dioxide lasers has particular advantages, it may be used to advantage in any gas laser in which a discharge is struck between electrodes.

What I claim is:

1. A method comprising forming a cathode electrode for a gas discharge laser by compressing a quantity of platinum black powder under high pressure to form a solid pellet of electrically conducting material.

2. A method as claimed in claim 1 in which the pressure is of the order of 50 tons per square inch.

3. A method as claimed in claim 2 in which the platinum black powder is heated in an atmosphere of hychogen at a temperature in the range 700° C. to 900° C. prior to compression.

4. A method as claimed in claim 3 in which the material contains a proportion of a metallic oxide, the method including the additional step of heating the compressed mass of material in an atmosphere of oxygen at a temperature and for a time sufficient to convert any exposed metal into its oxide.

* * * * *

UNITED STATES PATENT AND TRADEMARK OFFICE
CERTIFICATE OF CORRECTION

PATENT NO. : 4,344,905

DATED : August 17, 1982

INVENTOR(S) : Chilcot

It is certified that error appears in the above-identified patent and that said Letters Patent are hereby corrected as shown below:

On the cover page insert:

-- Foreign Application Priority Data

October 14, 1976 [GB] United Kingdom 42658/76 --.

In the claims:

Column 2, lines 40-41, (Claim 3) correct the spelling of "hychogen" to read -- hydrogen --.

Signed and Sealed this

Twenth-eighth Day of September 1982

[SEAL]

*Attest:*

GERALD J. MOSSINGHOFF

*Attesting Officer*     *Commissioner of Patents and Trademarks*